Aug. 9, 1955  L. ZAIGER ET AL  2,714,810

WINDSHIELD WIPER MECHANISM

Filed May 27, 1952

Inventors
Louis Zaiger
Robert I. Lappin
by Roberts, Cushman & Grover
att'ys.

United States Patent Office 2,714,810
Patented Aug. 9, 1955

2,714,810

WINDSHIELD WIPER MECHANISM

Louis Zaiger, Swampscott, and Robert I. Lappin, Marblehead, Mass.

Application May 27, 1952, Serial No. 290,264

1 Claim. (Cl. 64—29)

This invention relates to windshield wiper mechanism for dual wipers such as illustrated in Patents 2,559,208 and 2,566,843 and more specifically to an improvement in the drive from the wiper motor to the blades.

It is a common occurrence for the wiper blades to become frozen to the windshield either when the vehicle is parked or while driving in cold weather when rain or wet snow is falling in such quantity that the wipers are unable to clear the windshield with each sweep and hence the precipitation accumulates and freezes on the windshield. Under such conditions, that is when there is considerable opposition to movement of the blades or the blades are actually frozen in place the driving shaft and/or some of the gears and other linkages transmitting the motion from the motor to the blades may very likely be broken or where an electric motor is used the motor being held stationary while current is passing through it may burn out completely.

The principal object of this invention is to eliminate this hazard thus to preserve the wiper equipment under adverse conditions until the obstructing material can be removed. A further object is to provide a simple mechanism for temporarily releasing the drive when the wipers are obstructed and which can be incorporated in an existing wiper drive mechanism without substantial modification thereof.

As herein illustrated the driving shaft for the wiper linkage has made fast to one end a small pinion gear which as shown in one of the aforementioned patents, meshes with a reciprocating rack which thereby imparts oscillation to the shaft. The wiper linkage is connected to the shaft by way of an adaptor which forms the subject matter of the other of the foregoing patents and as therein illustrated is for connecting double wipers to the shaft. While the shaft is illustrated herein as oscillatory and the adaptor is of rather special design for purposes of adjustment it is to be understood that the shaft may be rotary and that a simple arm may be placed on the shaft in lieu of the adaptor to connect the wiper linkage to the shaft. In accordance with the invention the arm or adaptor is releasably locked to the shaft so that when the torque load resisting rotation or oscillation of the shaft reaches a predetermined amount the shaft will turn relative to the arm until the obstruction resisting movement of the wiper and hence the arm is removed. To this end the shaft has a lateral projection, the arm or adaptor has a recess adapted to receive a part of the lateral projection and there is yieldable means for pressing the adaptor against the projection so as to hold the projection seated in the recess and hence locked to the shaft for movement therewith. The yieldable means is designed to yield at a predetermined load well below the breaking point of any of the parts of the linkage or gears or stalling of the motor and hence to permit the shaft to turn freely while the arm remains stationary. The lateral projection takes the form of a pin set into a hole in the shaft with its end projecting radially, diametrically opposite each other from the shaft. The yieldable means includes a sleeve on the shaft which bears against the arm or adaptor, a boss on the shaft and a coiled compression spring disposed under compression on the shaft between the sleeve and boss so as to press and hold the pin seated in the recess in the arm or adaptor.

The invention will now be described in greater detail with reference to the accompanying drawings wherein.

Figure 2:
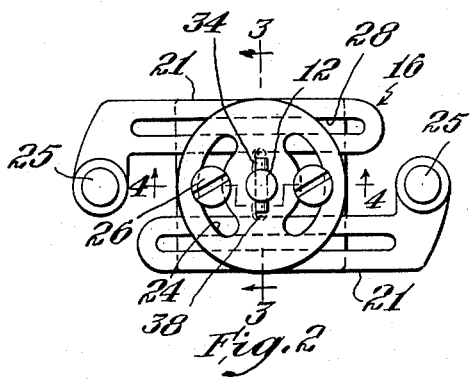
Fig. 2 is a top view looking vertically down on Fig. 1.

Referring to the drawings, the drive shaft 12 for transmitting motion from the wiper motor to the wiper linkage has made fast to one end a spur gear 14 which as illustrated in the foregoing Zaiger Patent No. 2,559,208 meshes with a reciprocating rack which thereby effects an oscillation of the shaft 12. As illustrated in the Lappin Patent No. 2,566,843 the shaft 12 has fast to its opposite ends an adaptor 16 for driveably connecting the linkage L of dual wipers to the shaft for reciprocation. For reasons pointed out heretofore, it may be desirable to have the adaptor immovably fast on the shaft 12 since if the wipers are prevented from moving by some obstruction such as ice or snow some one or more of the parts of the mechanism will give way by breaking. To avoid this the adaptor as illustrated herein is releasably locked to the shaft 12 and will normally oscillate therewith but if the resistance to rotation caused by blocking movement of the wipers reaches a predetermined amount which is chosen to be below the breaking point of any of the parts constituting the mechanism the adaptor will automatically be released from the shaft so that the latter will turn relative to the adaptor without injuries to the parts. When the obstruction is removed or the resistance so lessened that it is below the predetermined amount the locking means will automatically resume control and the wiper will operate in its normal manner.

As herein illustrated the adaptor like that shown in the foregoing patents consist of a pair of spaced plates 18 and 20 arranged parallel to each other between which are disposed a pair of arms 21 (Fig. 2) which may be locked between the plates by drawing them together into clamping engagement with the arms. The lower plate 18 is substantially rectangular in shape and the upper plate is circular and has concentric with its center arcuate slots 24 through which clamp screws 26 are passed and threaded into the rectangular plate 18 to draw the plates together. The rectangular plate 18 carries at opposite edges guide members 27 and the arms 21 have in them slots 28 for slidably engaging the members 27 thus permitting adjustment of the arms between the clamping plates and at the same time preserving their parallel relation with respect to each other. The end of each arm has fast to it a cylindrical boss or pin 25 to which the wiper linkage L is pivotally connected.

Figure 3:
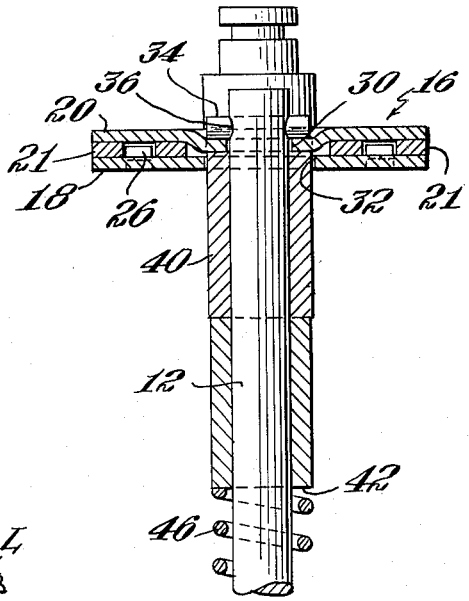
Fig. 3 is a vertical section to larger scale taken on the line 3—3 of Fig. 2.
Figure 1:
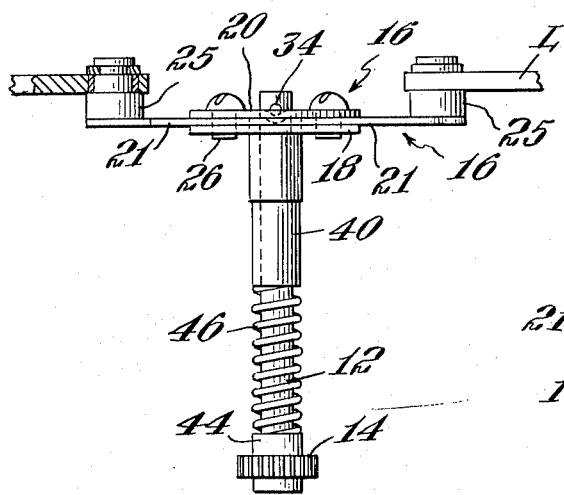
Fig. 1 is an elevation showing the driving shaft and adaptor, for connecting wiper linkage thereto, releasably locked to the shaft.
Figure 4:
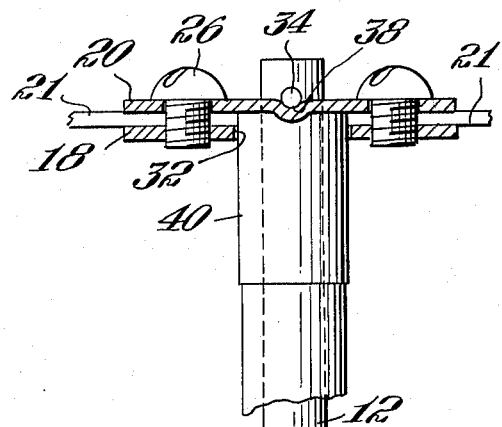
Fig. 4 is a vertical section to larger scale taken on the line 4—4 of Fig. 2.

In order to releasably lock the adaptor 16 to the shaft 12 the plate 20 (Figs. 3 and 4) has a central hole 30 in it of such diameter as to fit over the shaft and the plate 18 has a hole 32 concentric with the hole 30 of somewhat larger diameter for a purpose which will appear hereinafter. The adaptor is mounted on the shaft and is locked against rotation by pressing it against an abutment fast to the shaft. As illustrated (Fig. 3) the abutment is constituted by a pin 34 fixed in a hole 36 formed diametrically of the shaft so that its ends project radially from opposite sides of the shaft. The plate 20 has in its surface close to the shaft diametrically arranged recesses 38 adapted to receive the ends of the pin 36 when the adaptor is pressed toward the pin. The recesses 38 may be formed by deformation of the upper surface of the plate as shown in Figs. 3 and 4 and is deep enough to receive substantially the lower half of each end of the projecting pin. The plate is hardened to minimize wear. The opposite side of the plate has correspondingly formed raised ribs 39. To yieldably hold the adaptor against the pin and hence to lock it on the shaft there is mounted on the shaft below the adaptor a sleeve or bushing 40, the upper end of which passes through the hole 32 in the plate 18 and bears against the underside of the plate 20, maintaining it square with respect to the shaft. There is also fast to the shaft 12 a boss 44 (Fig. 1) preferably constituted by the hub of the gear 14, although it may be in the form of a collar independent of the gear. The upper end of the sleeve has in its diametrically arranged recesses 41, which receive the ribs 39. A coiled spring 46 is placed on the shaft between the lower end 42 of the sleeve 40 and the boss 44 in a state of compression so that it tends to force the sleeve against the underside of the ends of the pin plate 20 and thus to hold the pin 34 seated in the recesses 38 and the ribs 39 in the recesses 41. The depth of the recesses in the plate and sleeve and the design of the spring is such as to hold the ends of the pin in the recesses 38 and the ribs in the recesses 41 under all ordinary conditions and hence to effect a positive drive between the shaft and the adaptor to the wiper mechanism. Under extraordinary conditions, however, where the blades are obstructed by accumulation of snow or ice or actually frozen to the windshield the spring will yield under a predetermined torque and allow the end of the pin 34 to jump out of the recesses 38 and the ribs 39 to jump out of the recesses 41 thereby permitting the pin to ride on the upper surface of the plate 20 and the ribs to ride on the end of the sleeve and hence rotate freely so that even though the blades are prevented from movement the shaft 12 may continue to rotate. As soon as the obstruction is removed the spring 46 will restore the end of the pin 34 to the recesses 38 and the ribs to the recesses 41 and a positive drive will once more be established between the shaft and the adaptor.

While for the purpose of illustrating this invention the adaptor which forms the subject matter of Patent No. 2,566,843 is shown it is perfectly apparent that a conventional single or double arm may be substituted in place of the adaptor and may be releasably locked to a drive shaft for the purpose of driving wiper blades in the same manner without departing from the scope of the invention.

It should be understood that the present disclosure is for the purpose of illustration only and that this invention includes all modifications and equivalents which fall within the scope of the appended claim.

We claim:

In a power operated wiper mechanism, a driven shaft, a wiper operating arm having a hole through it for accommodation of the shaft, a diametrical depression in one side of the arm and a corresponding rib protruding from the opposite side thereof, and means operably connecting the drive shaft and the arm comprising a pin fast to the shaft at the side of the arm having the depression therein, with its ends extending diametrically therefrom for engagement with the depression, a sleeve on the shaft at the opposite side of the arm slidable axially on the shaft, said sleeve having a diametrical depression at one end with which the rib on the arm is engaged, a fixed shoulder on the shaft spaced from the sleeve and a partially compressed coiled spring on the shaft with its ends bearing respectively against the other end of the sleeve and the shoulder.

References Cited in the file of this patent
UNITED STATES PATENTS

| | | |
|---|---|---|
| 970,140 | Trowbridge | Sept. 13, 1910 |
| 1,466,148 | Sands | Aug. 28, 1923 |
| 1,860,750 | Riggs | May 31, 1932 |
| 2,060,325 | Kritz | Nov. 10, 1936 |
| 2,221,101 | Lefkowitz | Nov. 12, 1940 |
| 2,273,632 | Floraday | Feb. 17, 1942 |
| 2,477,521 | Martin | July 26, 1949 |
| 2,566,843 | Lappin et al. | Sept. 4, 1951 |

FOREIGN PATENTS

| | | |
|---|---|---|
| 635,810 | France | 1928 |